(12) United States Patent
Votaw et al.

(10) Patent No.: US 10,286,363 B2
(45) Date of Patent: May 14, 2019

(54) FUNCTIONALIZED CERAMIC MEMBRANES FOR THE SEPARATION OF ORGANICS FROM RAW WATER AND METHODS OF FILTRATION USING FUNCTIONALIZED CERAMIC MEMBRANES

(71) Applicant: LANCE ENERGY SERVICES, LLC, Houston, TX (US)

(72) Inventors: Waymon R. Votaw, Sugar Land, TX (US); Jacob L. Davis, Houston, TX (US); Edward E. Munson, Livingston, TX (US); Andrew R. Barron, Houston, TX (US); Samuel J. Maguire-Boyle, Houston, TX (US)

(73) Assignee: LANCE ENERGY SERVICES, LLC, Houston, TX (US)

( * ) Notice: Subject to any disclaimer, the term of this patent is extended or adjusted under 35 U.S.C. 154(b) by 0 days.

(21) Appl. No.: 14/084,122

(22) Filed: Nov. 19, 2013

(65) Prior Publication Data

US 2014/0291241 A1    Oct. 2, 2014

Related U.S. Application Data

(60) Provisional application No. 61/728,574, filed on Nov. 20, 2012.

(51) Int. Cl.
*B01D 61/04* (2006.01)
*B01D 61/14* (2006.01)
(Continued)

(52) U.S. Cl.
CPC ........... *B01D 71/025* (2013.01); *B01D 61/04* (2013.01); *B01D 63/066* (2013.01); *B01D 65/08* (2013.01);
(Continued)

(58) Field of Classification Search
CPC .... B01D 61/04; B01D 65/08; B01D 67/0048; B01D 67/0079; B01D 67/0093;
(Continued)

(56) References Cited

U.S. PATENT DOCUMENTS 6,187,195 B1 *   2/2001   Zarges et al. .................. 210/636
7,419,692 B1 *   9/2008   Kalenian .................... A23F 5/28
                                                                    426/433

(Continued)

OTHER PUBLICATIONS

Barron, A., et al. "A new functionalization strategy for oil/water separation membranes," Journal of Membrane Science, 382: 107-115 (2011). Available online Aug. 4, 2011.*

(Continued)

*Primary Examiner* — Katherine Zalasky
*Assistant Examiner* — Benjamin L Lebron
(74) *Attorney, Agent, or Firm* — David G. Henry, Sr.

(57) ABSTRACT

Components, systems, and methods for producing highly hydrophilitic, functionalized inorganic filtration membranes, pre-treating organic and biological-containing waste waters for minimal membrane fouling and scaling when processed using such functionalized membranes, and use of such functionalized membranes of the present invention in filtration systems for separating such pre-treated waste waters, all with respect to optimal permeate production rates, purity of permeate and resistance to fouling and scale formation on the membranes.

16 Claims, 10 Drawing Sheets

(51) Int. Cl.

| | | |
|---|---|---|
| *B01D 63/06* | (2006.01) | |
| *B01D 65/08* | (2006.01) | |
| *B01D 67/00* | (2006.01) | |
| *B01D 69/02* | (2006.01) | |
| *B01D 71/02* | (2006.01) | |
| *B01D 71/06* | (2006.01) | |
| *B01D 71/82* | (2006.01) | |
| *C02F 1/44* | (2006.01) | |
| *C02F 1/66* | (2006.01) | |
| *C02F 5/08* | (2006.01) | |
| *C02F 5/10* | (2006.01) | |
| *C02F 5/14* | (2006.01) | |
| *C02F 101/32* | (2006.01) | |
| *C02F 103/36* | (2006.01) | |

(52) U.S. Cl.
CPC ..... *B01D 67/0079* (2013.01); *B01D 67/0093* (2013.01); *B01D 69/02* (2013.01); *B01D 71/02* (2013.01); *B01D 71/024* (2013.01); *B01D 71/06* (2013.01); *B01D 71/82* (2013.01); *C02F 1/44* (2013.01); *C02F 1/444* (2013.01); *B01D 61/145* (2013.01); *B01D 67/0048* (2013.01); *B01D 71/022* (2013.01); *B01D 2311/04* (2013.01); *B01D 2311/12* (2013.01); *B01D 2311/18* (2013.01); *B01D 2321/162* (2013.01); *B01D 2321/168* (2013.01); *B01D 2323/02* (2013.01); *B01D 2323/36* (2013.01); *B01D 2325/36* (2013.01); *C02F 1/66* (2013.01); *C02F 5/08* (2013.01); *C02F 5/086* (2013.01); *C02F 5/10* (2013.01); *C02F 5/14* (2013.01); *C02F 2101/32* (2013.01); *C02F 2103/365* (2013.01); *C02F 2303/22* (2013.01)

(58) Field of Classification Search
CPC .... B01D 71/02; B01D 71/025; B01D 71/027; B01D 71/024; B01D 2311/04; B01D 2311/18; B01D 2321/162; B01D 2321/164; B01D 2321/168; B01D 2323/02; B01D 2325/36; B01D 61/145; B01D 63/066; B01D 69/02; B01D 71/022; B01D 71/06; B01D 71/82; B01D 2311/12; B01D 2323/36; C02F 1/44; C02F 1/444; C02F 1/66; C02F 5/10; C02F 5/14; C02F 5/08; C02F 5/086; C02F 2101/32; C02F 2103/365; C02F 2303/22

See application file for complete search history.

(56) References Cited

U.S. PATENT DOCUMENTS

| | | | | |
|---|---|---|---|---|
| 2006/0236668 | A1* | 10/2006 | Stobbe | B01D 67/0046 55/523 |
| 2007/0125701 | A1* | 6/2007 | Ramaswamy | B01D 67/0062 210/490 |
| 2009/0283475 | A1* | 11/2009 | Hylton | B01D 67/0079 210/644 |
| 2009/0314713 | A1* | 12/2009 | Shelby | B01D 63/10 210/636 |
| 2010/0264060 | A1* | 10/2010 | Tan | B01D 61/14 208/14 |
| 2012/0264180 | A1* | 10/2012 | Bresciani | B01D 53/58 435/128 |

OTHER PUBLICATIONS

DeFriend, K., et al. "Alumina and aluminate ultrafiltration membranes derived from alumina nanoparticles," Journal of Membrane Science, 224: 11-28 (2003).*

* cited by examiner

FUNCTIONALIZED CERAMIC MEMBRANES FOR THE SEPARATION OF ORGANICS FROM RAW WATER AND METHODS OF FILTRATION USING FUNCTIONALIZED CERAMIC MEMBRANES

CITATION TO PRIOR APPLICATION

Applicant claims priority for purposes of this application to Provisional U.S. Application Ser. No. 61/728,574, filed 20 Nov. 2012, from which priority is also claimed under 35 U.S.C. § 119(e) for purposes related to United States of America patent protection.

BACKGROUND OF THE INVENTION

Field of the Invention

The present invention pertains to apparatuses and methods for separation of constituents of a multi-constituent liquid solution or suspension.

Background Information

Developing methods and apparatus for separating organics (oil & greases, and biological materials) from raw water streams is important in many industries, including the oil & gas industry. The term "raw waters" is an industry term for describing waste-containing waters and is used hereafter to refer to any water that requires treatment, including but not limited to industrial, agricultural, domestic and potable water.

Whether simply considering environmental issues, or costs and effectiveness in complying with associated regulations and best practices, separating contaminants from raw waters is of increasing importance for 1) oil and gas industry flow-back water from hydraulic fracturing; 2) oil and gas industry produced water that flows from the wells during the production of oil and/or gas; 3) raw waters generated in the processing of food (e.g., meat and poultry); 4) sea water contaminated with oils and greases and biological materials; 5) municipal water supplies; and others.

Separating solids from liquids is nothing new—it has been practiced in various forms for hundreds of years. However, various new processes, devices and materials have been suggested during the past few decades in the never-ending quest for more effective and/or more efficient and cost-effective filtration methods and systems.

One widely accepted separation method involves Aluminum polymers, such as poly-aluminum hydroxychloride (also known as aluminum chlorohydrate or ACH), poly-aluminum chloride (PAC), or poly-aluminum siloxane sulfate (PASS). These polymers are often chemically combined with quaternized polymers, such as di-allyl di-methyl ammonium chloride (DADMAC), and are added to water to create flocculent materials that can be removed by skimming or filtration.

In recent years, membrane filtration has been shown to be one of the best methods for large-scale separation of raw water. Processing factors, such as recyclability of throughput material in cross flow membrane assemblies, ease of cleaning, as well as highly pure permeate with no chemical tainting are among the attractive features of this approach. A significant drawback of membrane purification, however, is membrane fouling. Fouling can arise from a number of factors, such as adsorption inside the membrane, deposition on the membrane surface to form a cake layer, and blocking of the membrane pores.

Membranes with hydrophilic surfaces have exhibited more desirable anti-fouling properties than more hydrophobic (less hydrophilic) membranes. It is envisioned that such properties are due to hydrophilic membranes being less sensitive to adsorption. However, industry has yet to achieve a suitably hydrophilic membrane that also meets other necessary or desirable performance characteristics. Prior approaches have concentrated on either fabricating membranes from hydrophilic polymers, or attaching high molecular weight hydrophilic materials to inorganic membranes.

This latter category of approaches includes surface segregation, surface coating, and surface graft polymerization. However, many of these methods have limitations that the present inventor now can show are avoidable. For instance, ceramic membranes offer good commercializable methods for separation. However, currently available ceramic membranes require very small pores ($\leq 50$ nm) for hydrocarbon/water separation. Such small pore sizes tend to decrease fluid flow rate and promote clogging. Furthermore, typical ceramic membranes are readily fouled by biological material from viruses, bacteria, and proteins. Attempts to overcome these small-pore issues results in other problems, including requirements for high flow rate pressures (involving higher equipment costs and energy consumption), or the need for less effective, much larger membrane pores. In any event, fouling still occurs through use of currently available ceramic membranes at rates now known by the present inventor to be avoidable through cost-effective and otherwise efficacious means. With fouling comes low net permeate rates, requirements for back-flushing of the permeate to clear the membrane, and often a shortened service life of the membrane (with associated elevated costs).

Therefore, while there is a compelling need to develop ever-more efficacious and cost-effective filtration systems and methods, and particularly ones that reduce or eliminate the present approaches' limitations of requiring multiple, time-consuming steps; high equipment costs; and significant energy consumption, it is clear that current industry investigative pathways including material science (e.g., substrate materials), manufacturing methods (e.g., sintering, casting, laser etching), and high molecular weight coatings teach away from the materials and methods of the present invention that (as described below) achieves just such objectives. In other words, industry experts and researchers have tried, but failed to achieve the hydrophilicity and organophobic performance of alumina-based reactant surfaces that are achieved through practice of the present invention, and, therefore, also failed to achieve long-needed filtration performance characteristics that are likewise first made possible by the present invention.

Practice of the present invention also reduces the number of steps, or time consumed by steps in effective filtration, is most cost effective per unit volume of processed raw waters, and/or reduces energy consumption associated with filtration will substantially benefit industry, as well as society at-large. Some benefits from such improved filtration may be apparent (direct operating costs savings, reduction in capital expenditures, reductions in labor costs, removing "choke points" in processes that involve filtration, and so on). However, other, less apparent benefits arise as well. For example, when filtration can be achieved cheaper, faster, with less labor requirements, and with simpler and/or smaller systems, many economic and practical barriers to the utilization of filtration systems and methods are substantially reduced. In many instances, this translates into higher levels of compliance with environmental regulations and associated reduction in overall environmental impact from many industrial processes.

As is described below, practice of the present invention affords the opportunity to meet, not just one, but all of the objectives of achieving optimal filtration of raw water by reducing direct operating costs, reducing capital expenditures for filtration systems, reducing labor costs, and removing "choke points" in processes that involve filtration (by accelerating the filtration process for a unit volume of raw water, when compared to conventional systems and methods).

DETAILED DESCRIPTION OF THE PREFERRED EMBODIMENT

To address the problems above, the present invention includes producing and using filtration membranes that are of an organophobic and highly hydrophilic nature. Such membranes are further characterized as having at least some surface areas that include porous, hydroxyl terminated substrates of inorganic materials and that are functionalized by hydrophilic molecules through a novel and unobvious process to achieve both a product conventionally thought not to be feasible (or even desirable), and one that exceeds all relevant performance parameters relevant to filtration or separation processes involving raw waters (or other "multi-constituent fluids"). Filtration membranes produced and used in accordance with the present invention resist fouling to a far greater degree than any known filtration membrane, while providing superior separation performance.

Filtration membranes of the current invention generally include: (1) a series of channels through which the waste stream flows, the size and shape of these channels being conventionally chosen based upon desired viscosity and flow rate characteristics; (2) a series of pores with pore sizes of 0.04 micron in diameter and larger; (3) surfaces of the membrane being functionalized by carboxylic acid(s); and (4) the respective substituent group of the carboxylic acid(s) being chosen to create a hydrophilic surface (e.g., cysteic acid, malonic acid).

One preferred manifestation of the present invention involves carboxylic acid as the hydrophilic agent associated with the ceramic. In some applications, the carboxylic acid has the general formula $RCO_2H$, where R is a hydrophilic functional group. Exemplary carboxylic acids include, without limitation, cysteic acid, 3,5-diiodotyrosine, trans-fumaric acid, malonic acid, octanoic acid, stearic acid, 3,5-dihydroxybenzoic acid, parahydroxy benzoic acid, and combinations thereof. Of these, cysteic acid is currently thought to be optimal.

Figure 1:
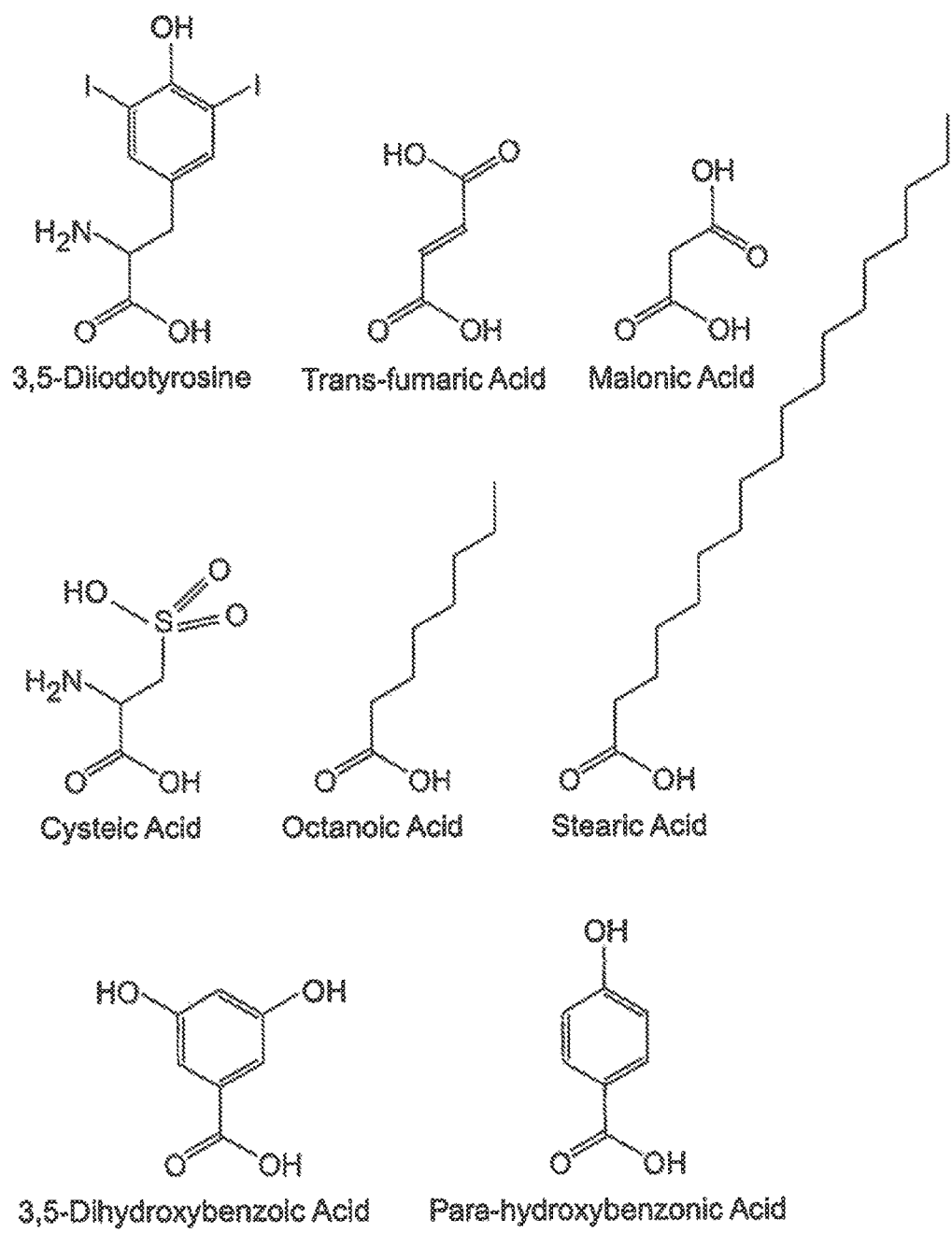
FIG. 1 depicts summaries of reaction conditions for carboxylic acid functionalization of alumina surfaces.

Contact angle measurements for a range of carboxylic acids functionalized onto alumina coated silicon wafers were investigated to determine the functionalization that results in the most hydrophilic surfaces. Using a modification of the literature method (C. T. Vogelson, A. Keys, C. L. Edwards, and A. R. Barron, Molecular coupling layers formed by reactions of epoxy resins with self-assembled carboxylate monolayers grown on the native oxide of aluminum, J. Mater. Chem., 13 (2003) 291-296), silicon wafers were coated with a thin layer of alumina (100 nm) via e-beam deposition. In order to remove impurities on the alumina surface, the coated wafers were dipped in a 1:1 solution of conc. $H_2SO_4$ and 30% $H_2O_2$ for 5 min. The wafer was then washed with 2-propanol and air dried. The alumina coated silica wafer was then gently refluxed at various temperatures depending on the functionalizing carboxylic acid. After the reaction was completed, the wafers were washed with IPA and air dried. Table 1 below and FIG. 1 provide summaries of reaction conditions for carboxylic acid functionalization of alumina surfaces.

TABLE 1

Summary of reaction conditions for carboxylic acid functionalization of alumina surfaces.

| Carboxylic acid | Mass (g) | Solvent | Volume (mL) | Molarity (M) | Temperature (° C.) | Reaction time (h) |
|---|---|---|---|---|---|---|
| 3.5-diiodotyrosine | 1.87 | DMSO | 20 | 0.1 | 160 | 24 |
| trans-fumaric acid | 2.32 | EtOH | 40 | 0.5 | 60 | 24 |
| malonic acid | 2.08 | $H_2O$ | 40 | 0.5 | 105 | 24 |
| cysteic acid | 3.74 | $H_2O$ | 40 | 0.5 | 105 | 24 |
| octanoic acid | 2.90 | DMSO | 40 | 0.5 | 160 | 24 |
| stearic acid | 1.14 | $CHCl_3$ | 40 | 0.1 | 61 | 24 |
| 3.5-dihydroxybenzoic acid | 3.08 | DMSO | 40 | 0.5 | 160 | 24 |
| para-hydroxybenzoic acid | 2.76 | DMOS | 40 | 0.5 | 160 | 24 |

Figure 2:
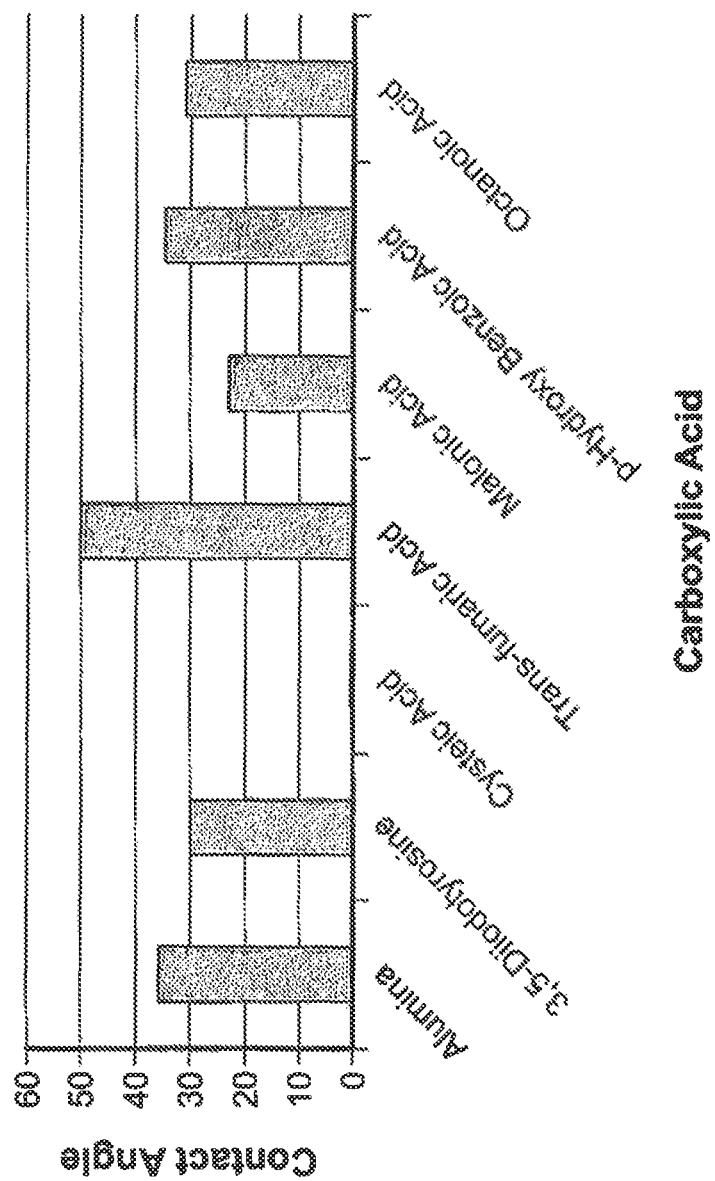
FIG. 2 depicts comparative wettability of functionalized alumina coated wafers using various reagents.

The surfaces were tested using goniometer contact angle techniques. From this it was observed that cysteic acid functionalized alumina coated wafers were extremely hydrophilic, achieving complete wettability when in contact with water. See FIG. 2.

In practice of the present invention the advantage of the carboxylic acid functionalization of the ceramic surface lies in its stability towards the kinds of raw waters described herein to be treated. Particularly advantageous of carboxylic acid attachment is its stability across a wide temperature range. This range would be inclusive of those raw waters expected from the highly significant sector of raw waters produced though hydraulic fracturing, with raw water temperatures reaching 140° F.

The ceramic membranes can be reacted with a wide range of hydrophilic molecules. Thus far, the present disclosure has focused on the use of carboxylic acids as the hydrophilic molecule for functionalization of the membrane, and examples provided herein focus on such species of the present invention. However, alternative ligands from the classes of zwitterionic molecules, phenyl amines, phenyl amidines (e.g., 1,3-diphenylamidine), and amino pyridines (e.g., methylaminopyridine) all have been shown to form bridging complexes with Group 13 metals (e.g., aluminum, gallium and indium). The inventors have demonstrated functionalization with carboxylic acids (e.g., cysteic acid) on alumina, titania, and zirconia. Similarly, the inventors have demonstrated functionalization of gallium arsenide with alternative ligands with like efficacy. Predictably, the carboxylic acid ligands used in the alumina functionalization were not effective on gallium arsenide due to the differences in atom-atom distances and lattice coefficients. However, the model used to predict the appropriate non-carboxylic ligands was effective in identifying proper moieties for gallium arsenide functionalization from available phenyl amines, phenyl amidines and amino pyridines. Similarly, the atomic structure (i.e., atom-atom distances) and structural characteristics (i.e., lattice constants) of alumina, titania, and zirconia are known and were predictably functionalized with functionalizing ligands with known bridging distances.

With the bridging or capping distances known of target ligands of the classes of zwitterionic molecules, phenyl amines, phenyl amidines, and amino pyridines appropriate linkage moieties can be chosen considering materials availability and costs and functional behavior. Target ligands of the classes of zwitterionic molecules, phenyl amines, phenyl amidines, and amino pyridines may be acceptable alternatives to using carboxylic acids as the functionalization ligand in lieu of or in combination with carboxylic acids.

Figure 3:
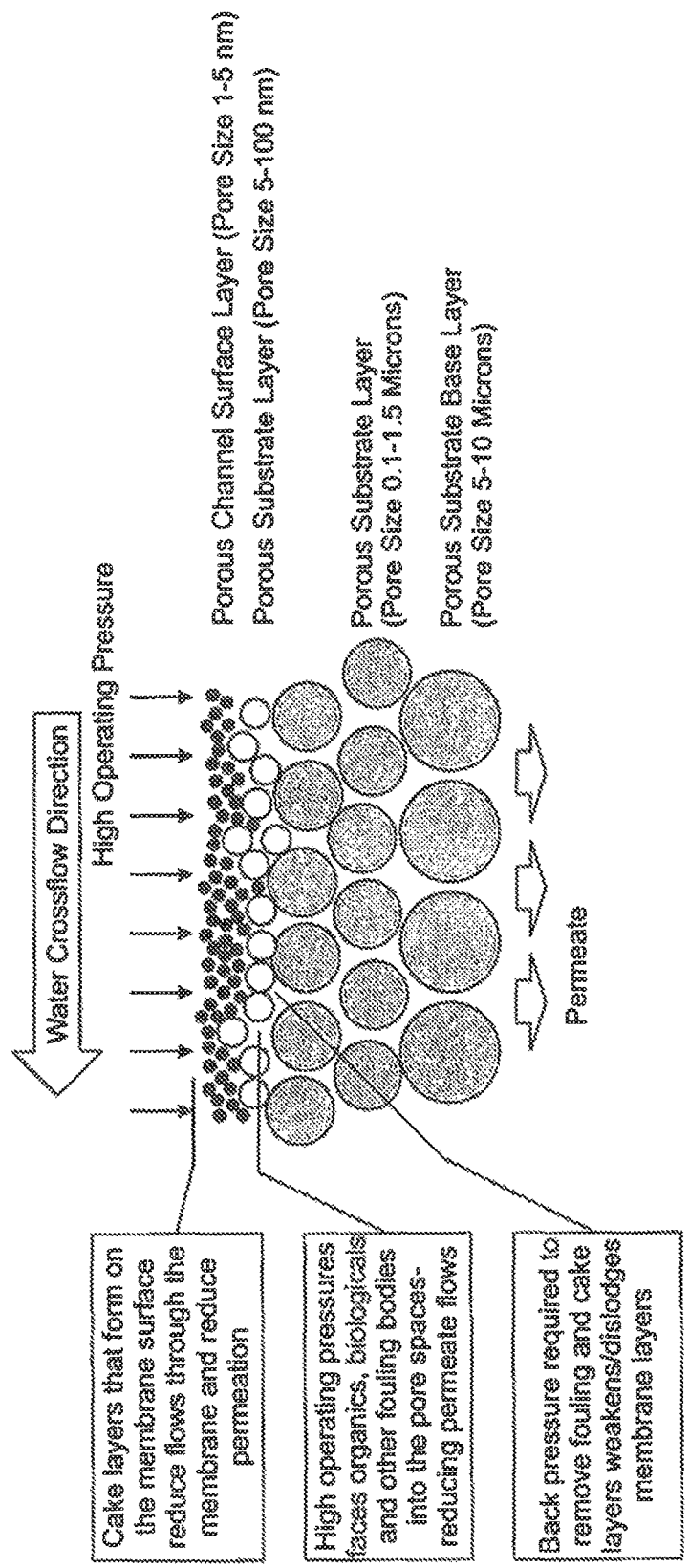
FIG. 3 provides a general depiction of the functionality of cross-flow membrane function (including that thought to be optimal for use of the filtration membranes of the present invention).
Figure 4:
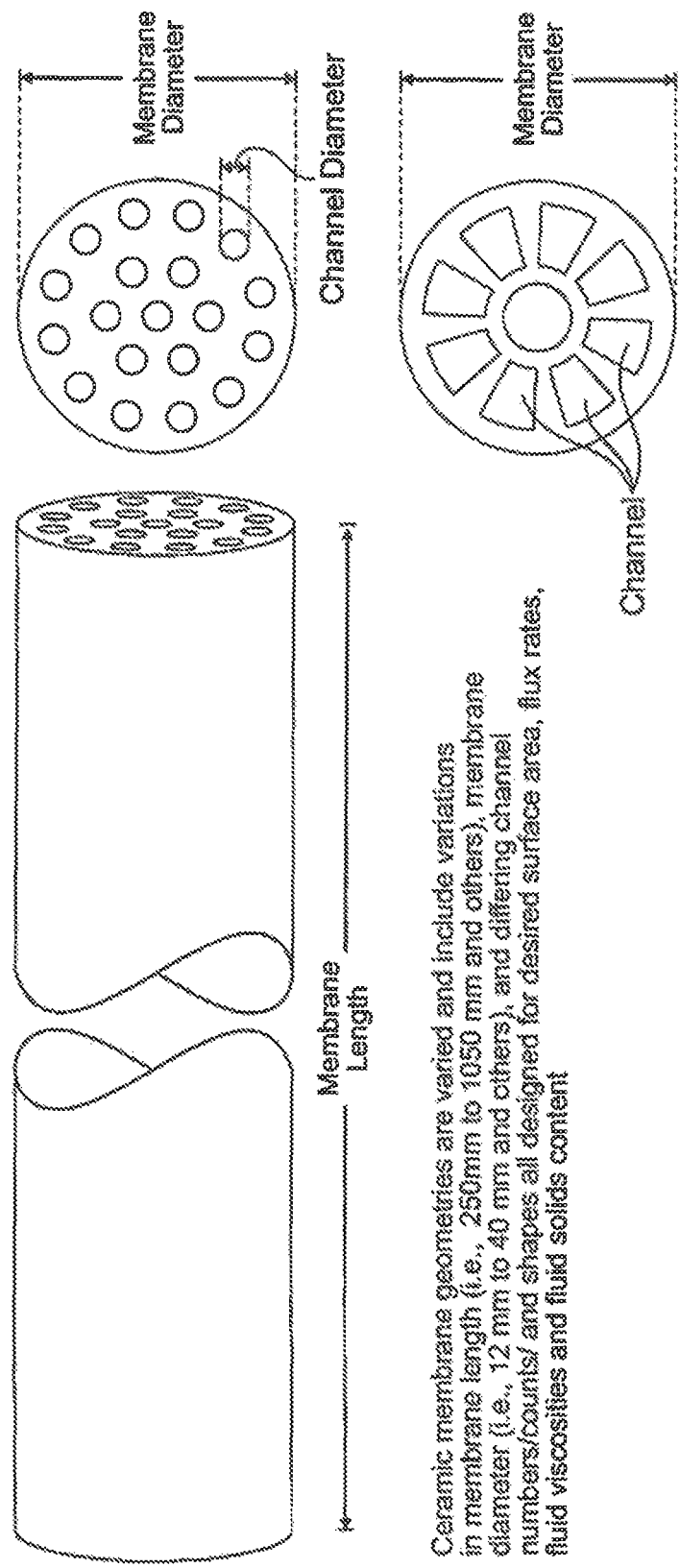
FIG. 4 depicts the general structure of a filtration membrane.

A general depiction of the functionality of cross-flow membrane function (including that thought to be optimal for use of the filtration membranes of the present invention), as well as of the overall filtration membrane structure itself is provided in FIGS. 3 and 4. The geometries, number of channels, pore sizes, etc. can be altered to tune the membrane to raw water viscosities and desired flow rates, according to conventional manner.

Ceramic membranes may be derived from various sources, with the preferred membranes for use in conjunction with the present invention having at least some alumina (e.g., $Al_2O_3$), titania ($TiO_2$), and/or zirconia ($ZrO_2$) reactant surfaces (the surfaces that will be treated according to the present invention and will ultimately come into contact with in-process raw waters).

Membranes manufactured of alumina, titania, and zirconia have an available oxidation that presents a dense hydroxyl terminated surface for functionalization in aqueous low pH conditions. This aspect of the present invention focuses on the use of surface hydroxyl groups for self-assembling monolayers of hydrophilic molecules (non-limiting examples of such hydrophilic molecules include carboxylic acids, zwiterrionic molecules, phenyl amines, phenyl amidines, amino pyridines, and combinations thereof). The currently thought optimal such hydrophilic agent is cysteic acid.

Functionalization according to the present invention is accomplished through: 1) acidification for hydroxyl maximization, and 2) contact of the hydrophilic molecule (preferentially cysteic acid in aqueous solution).

A filtration membrane of the present invention may be used in a crossflow system, which is thought to be the optimal context of such use. A porous crossflow ceramic membrane system of the present invention will generally include: (1) a series of channels through which the waste stream flows, the size and shape of these channels being chosen based upon viscosity and flow rate requirements; (2) a series of pores with pore sizes of 0.04 microns in diameter and larger; (3) the surface of the membrane functionalized by carboxylic acids; and (4) the substituent group of carboxylic acid chosen to create a hydrophilic surface (e.g., cysteic acid, malonic acid) that inhibits fouling of the membrane.

Figure 5:
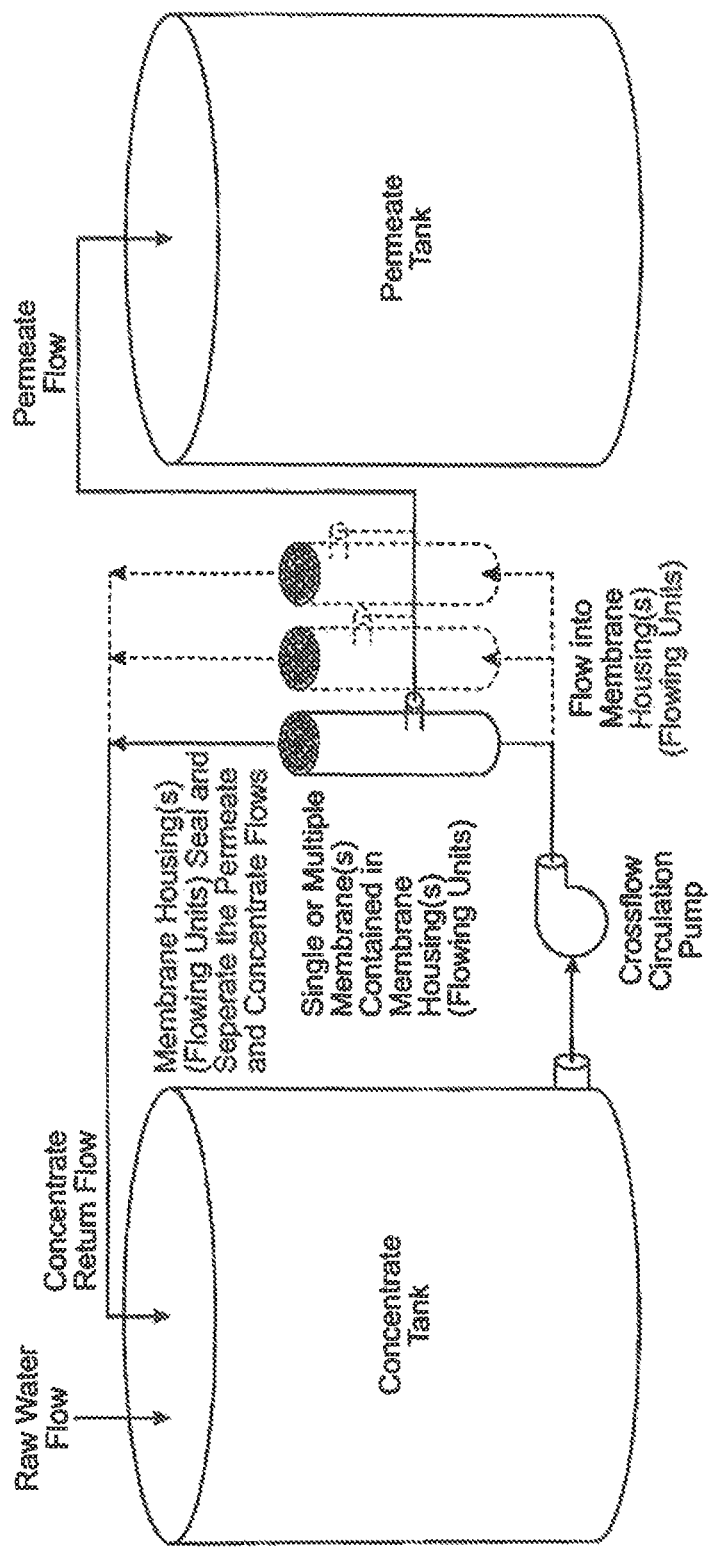
FIG. 5 depicts a cross-flow systems as is useful in conjunction with the present invention.

As illustrated in FIG. 5, a crossflow system itself will generally included: (1) the above-described, functionalized ceramic membranes; (2) membrane housings that provide the separation of concentrate and permeate streams from the feed to the system; (3) pump(s) with capacity for recirculating the raw water within the system and for feeding water from concentration tank(s) to the system; and (4) a controller that monitors flow rate, and physical and chemical properties of the waste stream, permeate, and concentrate.

In operation, raw waters containing organic compounds flow through housings in the crossflow system. This results in the retention of organic compounds and/or biological materials in the concentrate and the release of the permeate. This, in turn, results in the purification of the raw water sample through separation. In practice, the organophobic properties of the functionalized membranes have produced separation rates of >97% of the total petroleum hydrocarbons, oils & greases, and biological compounds from the raw water samples.

The permeate stream has been verified empirically to contain soluble and miscible ions, elements, and compounds, but is generally free of suspended solids and organic compounds (not including low molecular weight soluble organic compounds). In some embodiments the concentration of the organic compounds and/or biological matter in the concentrate may be large due to recycling the concentrate through the membrane channels for a second (or multiple) times.

Overall, the systems, membranes, and methods of the present invention can be utilized to reduce the carbon content of various raw waters. Such results provide various advantages over the systems, membranes, and methods of the prior art. For instance, the experimental data shows that the use of ceramic membranes of the present invention reduces the pump pressure required (relative to non-functionalized membranes) for a particular flux from about 6-7 bar to about 0.25-2.0 bar. More importantly, reduction of fouling allows the membranes to perform at a steady state over time with minimized need for back-pulsing or flushing.

Empirical analysis of the performance of the membranes in a crossflow configuration such as described has allowed the determination of optimal ranges of operation for both water velocity through the membranes and the trans-membrane pressure required to maximize permeate production. These parameters can be controlled independently to optimize the performance of the systems. For example, velocity is controlled by the circulation pump that continually circulates the raw water through the housings. Empirical data has shown that the permeate production (and flux rates) are optimal in control schemes where the pressure drop is minimized through the membranes balanced against maintaining good mass flow of the clean water portion of the raw water through the membranes.

Data from testing on multiple raw waters has shown that velocities in the range of 2.4 to 3.5 meters per second produce optimal permeate flow for the range of raw waters tested.

Similarly, trans-membrane pressure has been optimized within the systems to achieve optimal permeate production rates. Trans-membrane pressures are balanced between sufficient pressure to drive permeate flow through the membranes yet low enough to reduce the motive force on colloidal foulants to avoid the buildup of excessive solids that would reduce permeate flow. Empirical data over multiple raw water samples has shown that the system operates optimally in the 0.25 to 1.0 bar range of trans-membrane pressure for the range of raw waters tested. The optimization of trans-membrane pressures is possible outside of the range above and is dependent on the quantity and type of suspended solids (colloids) in the raw water.

A filtration membrane of the current invention may also be used in a "dead end" system. A dead end system will be generally include: (1) functionalized ceramic membranes as described herein; (2) dead end design (usually outside in) membranes that provide the separation of a permeate streams from the feed water volume in the system; (3) feed pump(s) with capacity for supplying the raw water to the system; and (4) a controller that monitors flow rate, and physical and chemical properties of the waste stream, permeate, and concentrate.

In operation, raw waters containing organic compounds flow through dead end membranes in the system. This results in the retention of organic compounds and/or biological materials in the concentrate and the release of the permeate. This in turn results in the purification of the raw water sample through separation.

Analysis of the performance of the membranes in a dead end configuration is conducted to determine optimal ranges of operation for the trans-membrane pressure required to maximize permeate production relative to back-washing frequency intensity. As with use in the crossflow system context, the permeate stream has been verified empirically to contain soluble and miscible ions, elements, and compounds, but is generally free of suspended solids and organic compounds (not including low molecular weight soluble organic compounds). In some embodiments the concentration of the organic compounds and/or biological matter in the concentrate may be large due to increasing concentration in the feed tank volume over time.

Advantages afforded by the present invention, not available through use of systems, membranes, and methods of the prior art, further include the reduction of fouling. This facilitates membranes performing at a steady state over time with minimized need for back-pulsing or flushing.

The functionalized membrane of the present invention exhibits dramatic improvements in the rejection of organics (biological and oils and grease), but is susceptible to scaling and colloidal fouling as would an un-functionalized membrane be. Reversal of membrane fouling is accomplished with the functionalized membranes in a manner consistent with industry practice to include use of acids, bases and surfactants.

Conventional filtration membranes are susceptible to the following sources of fouling, with the related benefit of the filtration membranes of the current invention being shown in conjunction therewith:
1. Biological foulants such as bacteria and viruses—filtration membranes of the current invention reject biological foulants, resulting in a dramatically reduced rate of fouling
2. Hydrocarbon foulants such as oils and greases—filtration membranes of the current invention reject organics, resulting in a dramatically reduced rate of fouling
3. Colloidal foulants such as particulates or suspended solids—filtration membranes of the current invention are resistant to colloidal fouling due to the establishment of a water boundary layer that protects the membrane surface. However, the invention membranes must be operated to optimize velocities and trans-membrane pressures (as described above in the description of a crossflow system involving the present invention) to maximize the permeate flow through the minimization of colloidal fouling layers formed on the membrane channels.

However, scaling (such as carbonate or sulfate scales) is just as much of a problem for the functionalized membranes of the present invention as for conventional membranes, and requires the pretreatment of raw waters to prevent the deposition of scale on the membrane surface and within the pore space of the membranes.

A pretreatment process can be generalized as follows:
1. Testing the water chemistry of the raw waters to be separated,
2. Modeling the raw waters to determine the saturation levels of the water/ionic content, solids content, level of total organic carbon, amount of oils & greases, etc.,
3. Determination of the type and dosage rate of scale inhibitors required for the raw water (e.g., to control supersaturated Barite-BaSO4),
4. Determination of pH adjustment required to control for soluble scales (e.g., Calcium Carbonate-$CaCO_3$),
5. Determination of oxidant type and dosage rate to remove Iron and other soluble metals, and
6. Determination of the pretreatment plan to include dosing sequences and mixing requirements.

The alkaline earth cations, $Mg_2+$, $Ca_2+$, $Ba_2+$, $Sr_2+$, are the predominant divalent metal ions in produced brines in the oil and gas industry. Divalent metals are also prevalent in mining, groundwater and other raw waters requiring treatment. Scale inhibition can be accomplished with phosphates, phosphonates, polyphosphonic acid, acrylates, polyacrylates, or by other additives that chelate the metal ions or inhibit the formation of scaling crystals or foul the crystals to retard their growth. The determination of scale risks is accomplished with geochemistry models available to the industry including "SCALESOFTPITZER", "PHREEQC" INTERACTIVE 2.18.3.670, and others. Sample saturation indices output from Phreeqc Interactive are shown below:

| Phase | SI | log IAP | log KT | |
|---|---|---|---|---|
| Anhydrite | −0.99 | −5.34 | −4.35 | CaSO4 |
| Aragonite | −0.22 | −8.53 | −8.31 | CaCO3 |
| Barite | 1.81 | −8.23 | −10.03 | BaSO4 |
| Calcite | −0.07 | −8.53 | −8.46 | CaCO3 |
| Celestite | 0.12 | −6.51 | −6.62 | SrSO4 |
| Dolomite | −0.48 | −17.48 | −17.00 | CaMg(CO3)2 |
| Fe(OH)3(a) | 0.26 | 5.15 | 4.89 | Fe(OH)3 |
| Goethite | 6.03 | 5.17 | −0.86 | FeOOH |
| Gypsum | −0.80 | −5.38 | −4.58 | CaSO4:2H2O |
| Halite | −1.56 | 0.01 | 1.57 | NaCl |
| Hausmannite | −22.43 | 39.58 | 62.01 | Mn3O4 |
| Hematite | 14.08 | 10.37 | −3.71 | Fe2O3 |
| Manganite | −8.81 | 16.53 | 25.34 | MnOOH |
| Melanterite | −5.31 | −7.56 | −2.26 | FeSO4:7H2O |
| Pyrochroite | −8.72 | 6.48 | 15.20 | Mn(OH)2 |
| Pyrolusite | −15.44 | 26.58 | 42.01 | MnO2 |
| Rhodochrosite | −1.23 | −12.35 | −11.12 | MnCO3 |
| Siderite | 0.27 | −10.59 | −10.87 | FeCO3 |

-continued

| Phase | SI | log IAP | log KT | |
|---|---|---|---|---|
| Smithsonite | −3.80 | −13.75 | −9.96 | ZnCO3 |
| Strontianite | −0.43 | −9.70 | −9.27 | SrCO3 |
| Sulfur | −39.63 | −34.66 | 4.97 | S |
| Witherite | −2.85 | −11.42 | −8.57 | BaCO3 |

Interpretation of the models to determine supersaturation risks and means of management is conducted prior to the full scale processing of raw waters.

Scales have been successfully inhibited with the use of available chemicals (including polyacrylates, phosphonates) to prevent scale formation and allow the functionalized membranes to perform as intended in the rejection of organics (hydrocarbons and biologicals). Dosing of inhibitors is determined based on manufacturers recommended threshold levels and experience.

Additionally, scales are managed by the determination of the solubility products of potential sealants based on the water chemistry of the raw water to be treated (models used include "ScaleSoftPitzer", "Phreeqc Interactive 2.18.3.6670", and others). Through determination of the saturation level of ions and their related scales (e.g., aragonite, calcite, hematite, etc.), pH can be modified through the addition of acids in the raw water to move the raw water to a state of undersaturation for a subset of scales in order to maintain the solubility of the ions and prevent scales on the membrane.

Figure 6:
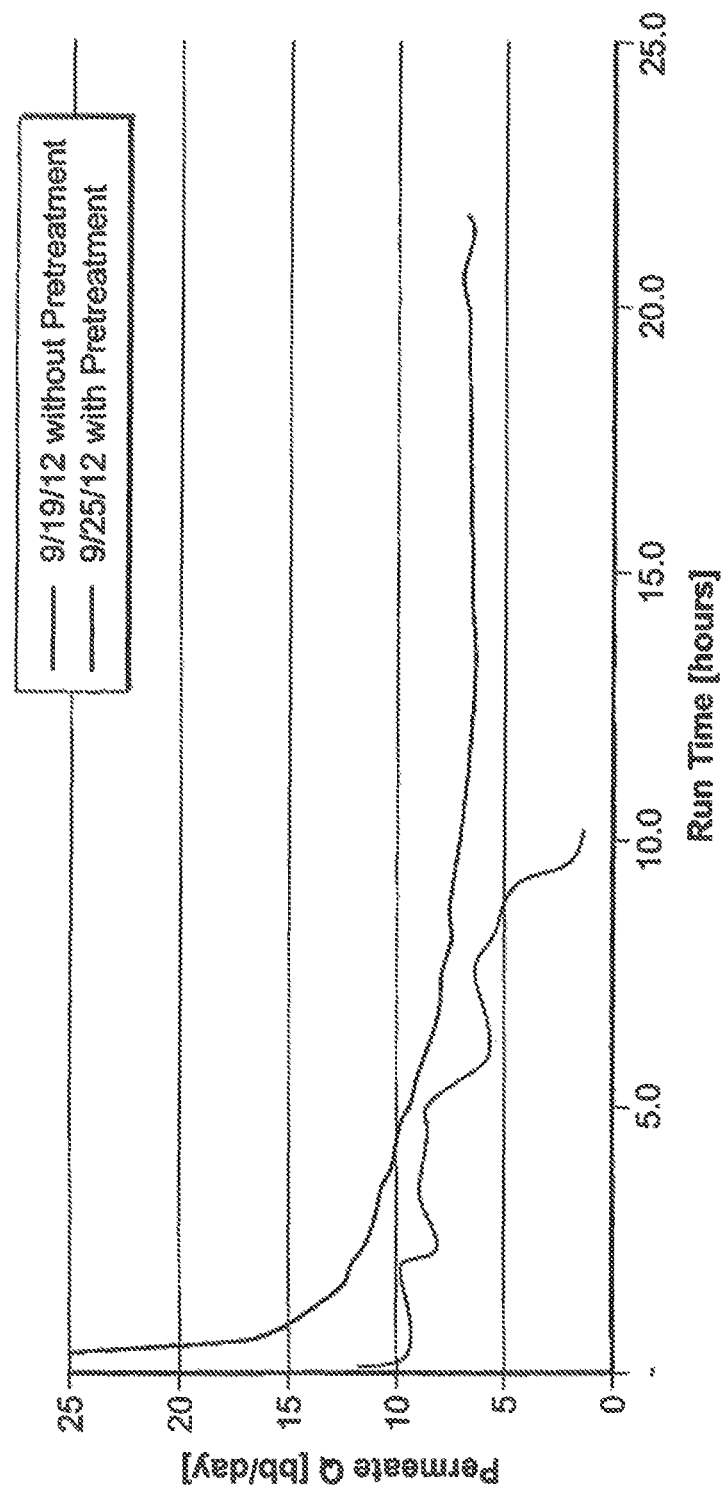
FIG. 6 depicts a representative comparison of functionalized membranes without pretreatment (the lower y-axis and shorter x-axis graph line) and with the use of pH adjustment and the addition of a scale inhibitor (HEDP phosphonate in the test shown—the upper y-axis, longer x-axis graph line).

A combination pH adjustment to manage solubility and the addition of scale inhibitors effectively prevents the formation of scales on the functionalized membrane and allows the membrane to perform its intended purpose of rejecting or separating organics from the raw water. A representative comparison of functionalized membranes without pretreatment (the lower y-axis and shorter x-axis graph line) and with the use of pH adjustment and the addition of a scale inhibitor (HEDP phosphonate in the test shown—the upper y-axis, longer x-axis graph line) is shown in FIG. 6.

Practice of the present invention optimally includes use of tubular ceramic membranes functionalized with hydrophilic chemicals as described above. Multiple methods have been tested and validated for the application of hydrophilic molecules to the membranes.

A. Vacuum Application

Tubular ceramic membranes with the application of hydrophilic molecules by using a vacuum pump to pull a vacuum on a vessel filled with the hydrophilic molecules in solution to apply the hydrophilic molecules to a large fraction of the membrane surface area including pore space. This method proves viable, but is maintenance intensive in a commercial setting and was found to be less cost effective.

B. Static Submersion

Designs for large scale application of the hydrophilic molecules to ceramic membranes using static submersion treatment were tested. This provides a viable treatment method, but provides a lower coverage of the available surface area, particularly in the pore space of the membranes. This method is effective in the partial functionalization of the membranes and can be utilized in the treatment of raw waters that have less extreme contaminant levels and in cases of reduced inorganic scale risk.

C. Recirculating Linear Treatment

Recirculating flow through the flow channels of ceramic membranes has been investigated for effectiveness, cost and commercial scalability. Recirculating linear treatment is accomplished by flowing hydrophilic molecules in solution through the flow channels of ceramic membranes. This is a viable treatment methodology, but this methodology only produces a surface treatment of the membrane and does not produce a full treatment of the traveled path that raw water will take in the use of the membranes. This method is effective in the partial functionalization of the membranes and can be utilized in the treatment of raw waters that have less extreme contaminant levels and in cases of reduced inorganic scale risk.

Additionally, linear treatment of multiple membranes in a commercial setting was performed and was found to be effective in short duration testing.

D. Recirculating Flowing Design

Figure 7:
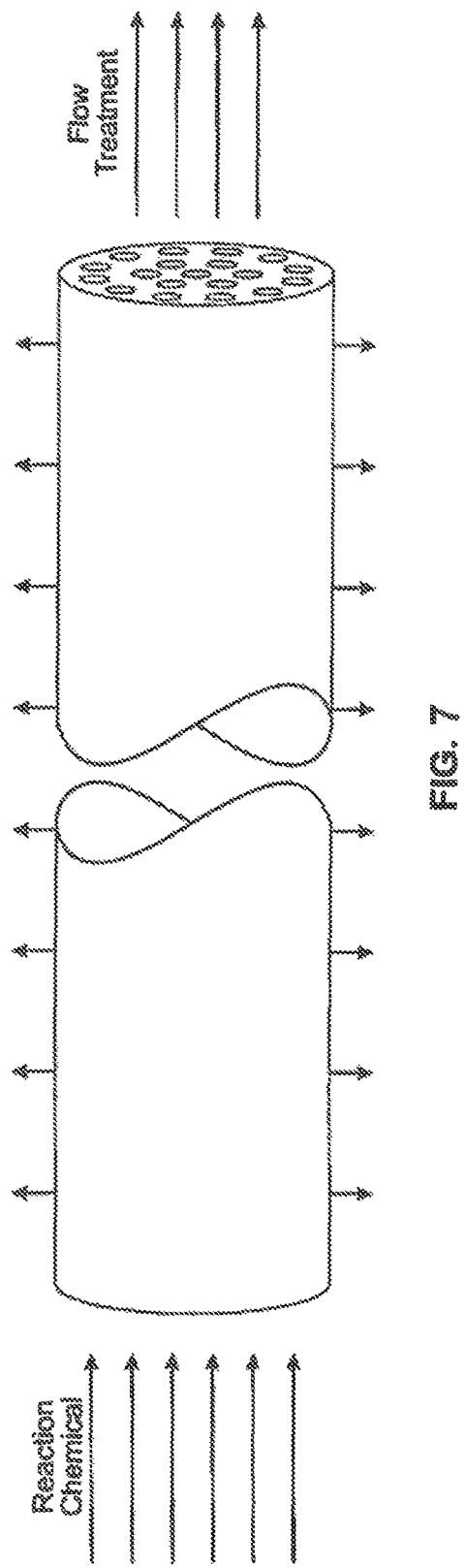
FIG. 7 depicts the flow characteristics of liquid though a filtration membrane as an example of practice of the present invention.

The inherent flow characteristics of ceramic membranes designed for raw waters separation renders the currently-envisioned, optimal functionalization method. In the preferred method for functionalization (flow treatment), the hydrophilic molecules in solution are re-circulated through the flow channels of the membranes but were forced to flow through the pore spaces in the membrane to simultaneously treat the internal flow channels, pore space, and outside diameter of the membranes (see FIG. 7).

By treating the totality of the membrane surface area, the commercial effectiveness of the membrane is optimized by both 1) protecting all membrane surfaces that come in contact with raw waters and the soluble fraction of the raw waters, and 2) extending the useful life of the membrane under abrasive conditions. If abrasive suspended particles abrade the interior channel surface over time, this would reduce the hydrophilicity of the surface treat membrane through removal of the ceramic substrate.

In the preferred flow treatment method, all surfaces in contact with waters are protected by the organophobic boundary layer, and have increased tolerance to abrasion due to the application of hydrophilic molecules through the ceramic membrane substrate pore space.

Figure 8:
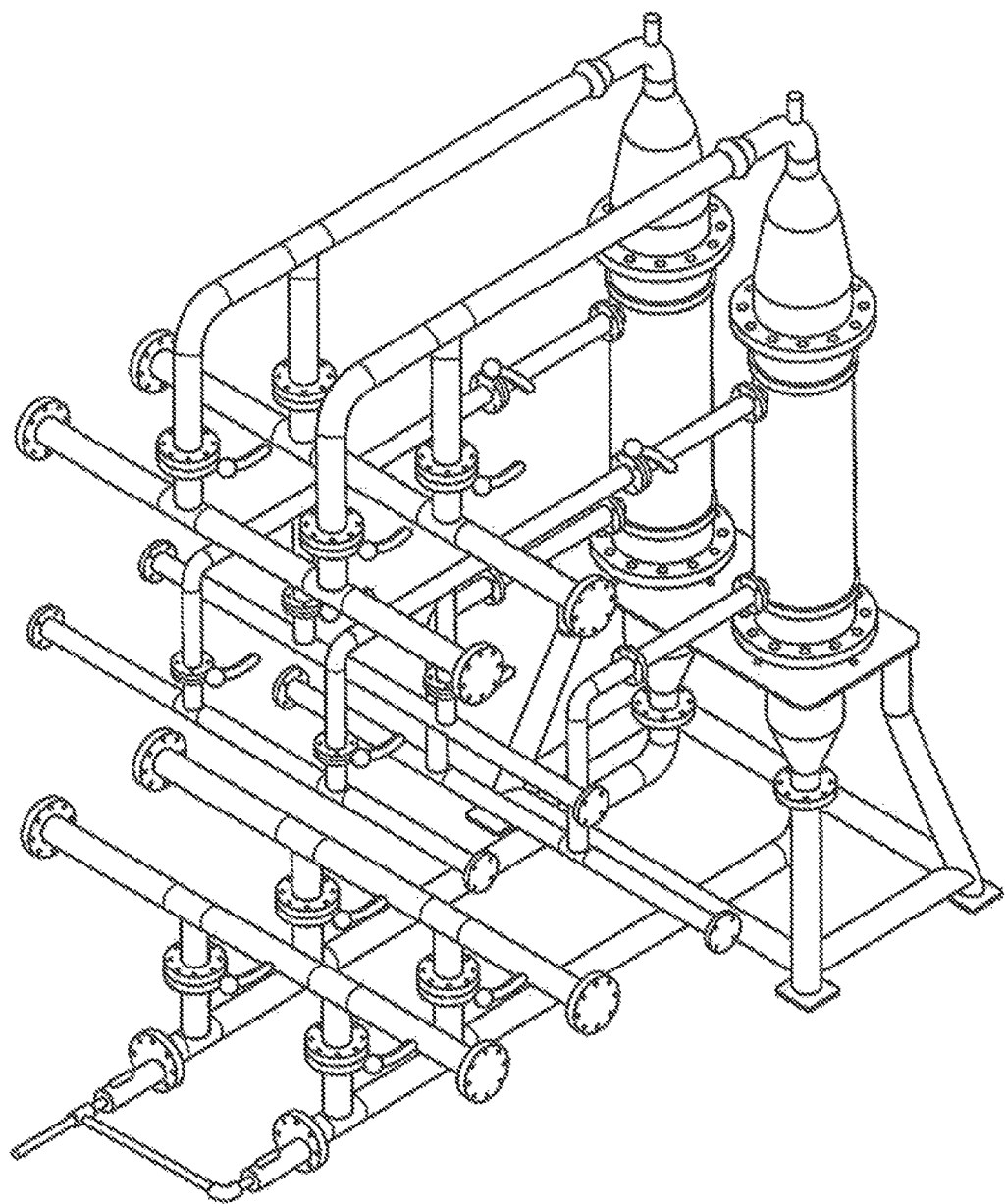
FIG. 8 depicts a exemplary system design for the flow treatment method of membrane functionalization.
Figure 9:
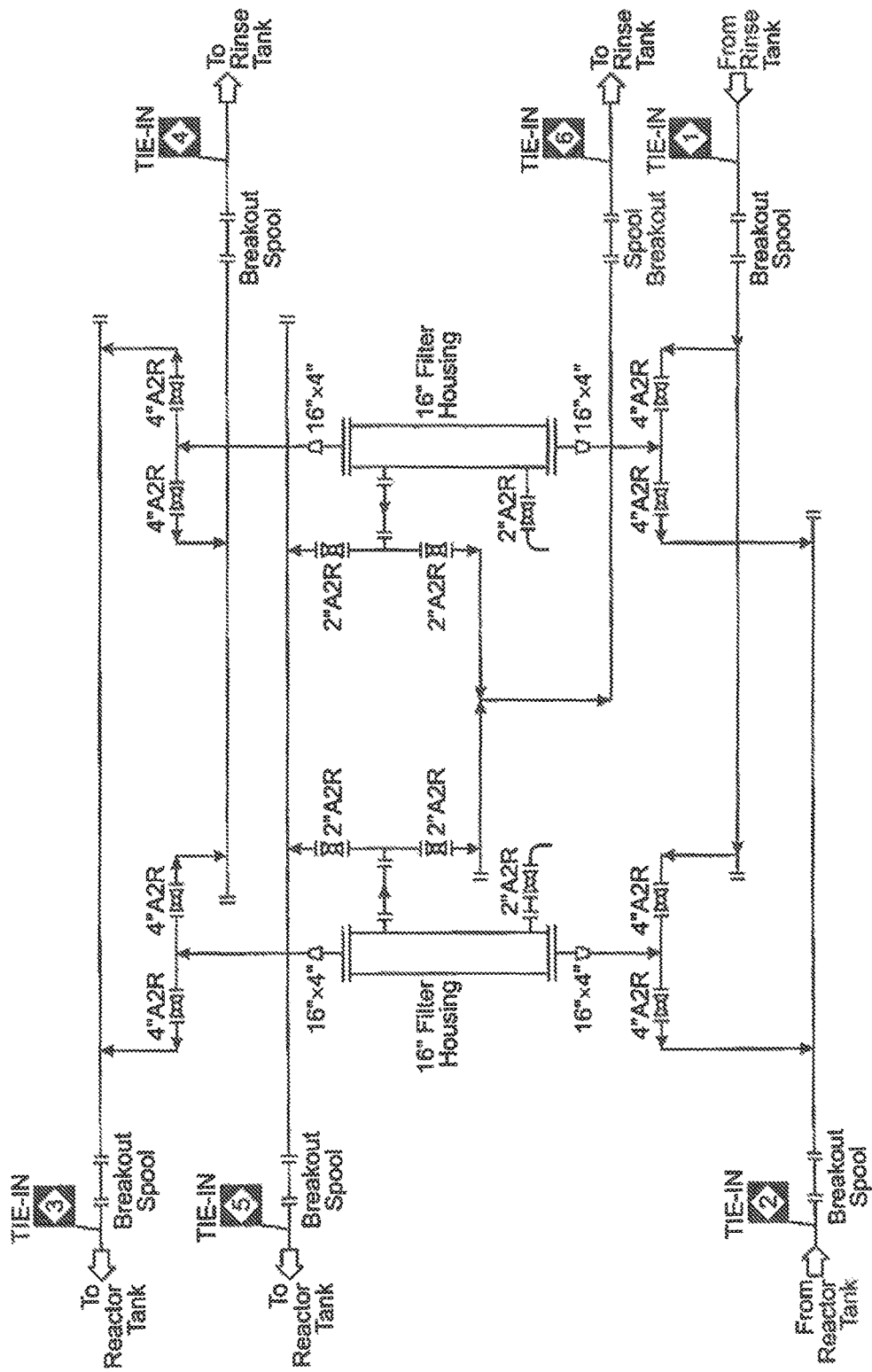
FIG. 9 depicts the process flow diagram of a system such as is depicted in FIG. 8.

The preferred system design for the flow treatment method of membrane functionalization is generally depicted in FIG. 8. According to this design, the reaction chemical is pumped to the bottom of the housings on the depicted right side of the drawing and flowed upward through the membranes within the housing. The reaction chemical then flows through the membrane channels and through the membrane pore spaces to exit at the top of the membrane housing and from the smaller permeate return lines exiting from the side of the housing. Upon exit from the housings, the reaction chemical is returned to the reaction chemical tank for recirculation to the housings. The process flow diagram for the design above is depicted in FIG. 9.

The flow treatment method of functionalization of ceramic membranes has been shown to be superior to submersion and surface treating recirculation methods as evidenced by the proportion of membrane surfaces treated and the amount of reaction chemical applied to the membrane surfaces. The amount of reaction chemical applied to surface treated membranes was calculated to be 23.27 grams per membrane on average over a batch run of 324 membranes (on an anhydrous basis calculated based on measured change in reaction tank concentration net of chemical additions).

The amount of chemical applied by surface treatment was verified through thermal removal of the functionalized surface from a pulverized representative membrane sample. The pulverized sample was heated to 400 degrees C. with the thermal decomposition of the sample evaluated with thermogravimetric and differential thermal analysis to determine the weight loss through the volatilization of the functionalized surface. Initial mass loss was observed at approximately 100 degrees C. as the surface water was removed from the hydrophilic surface. Additional mass loss was observed at approximately 200 degrees C. as the organic functionalized surface was removed from the alumina substrate. The measured weight loss after water removal from the sample was 0.94% or 23.69 grams per membrane confirming the calculated values of chemical applied.

After conversion from surface treatment equipment to the flow treatment reactor design described above, 306 membranes were functionalized in 9 batches of 37. The calculated amount of reaction chemical applied to surface treated membranes was a minimum of 48.13 grams per membrane on average (on an anhydrous basis calculated based on measured change in reaction tank concentration net of chemical additions). This represents slightly over a 50% increase in chemical application over prior methods.

The reactor utilized to functionalize ceramic membranes is operated such that the maximum amount of hydrophilic molecules is delivered to and is applied to the surfaces of the membranes in the housings. The control scheme utilized is based on the mass loss of chemical in the reaction tank as a proxy for the surface uptake on the membranes.

Figure 10:
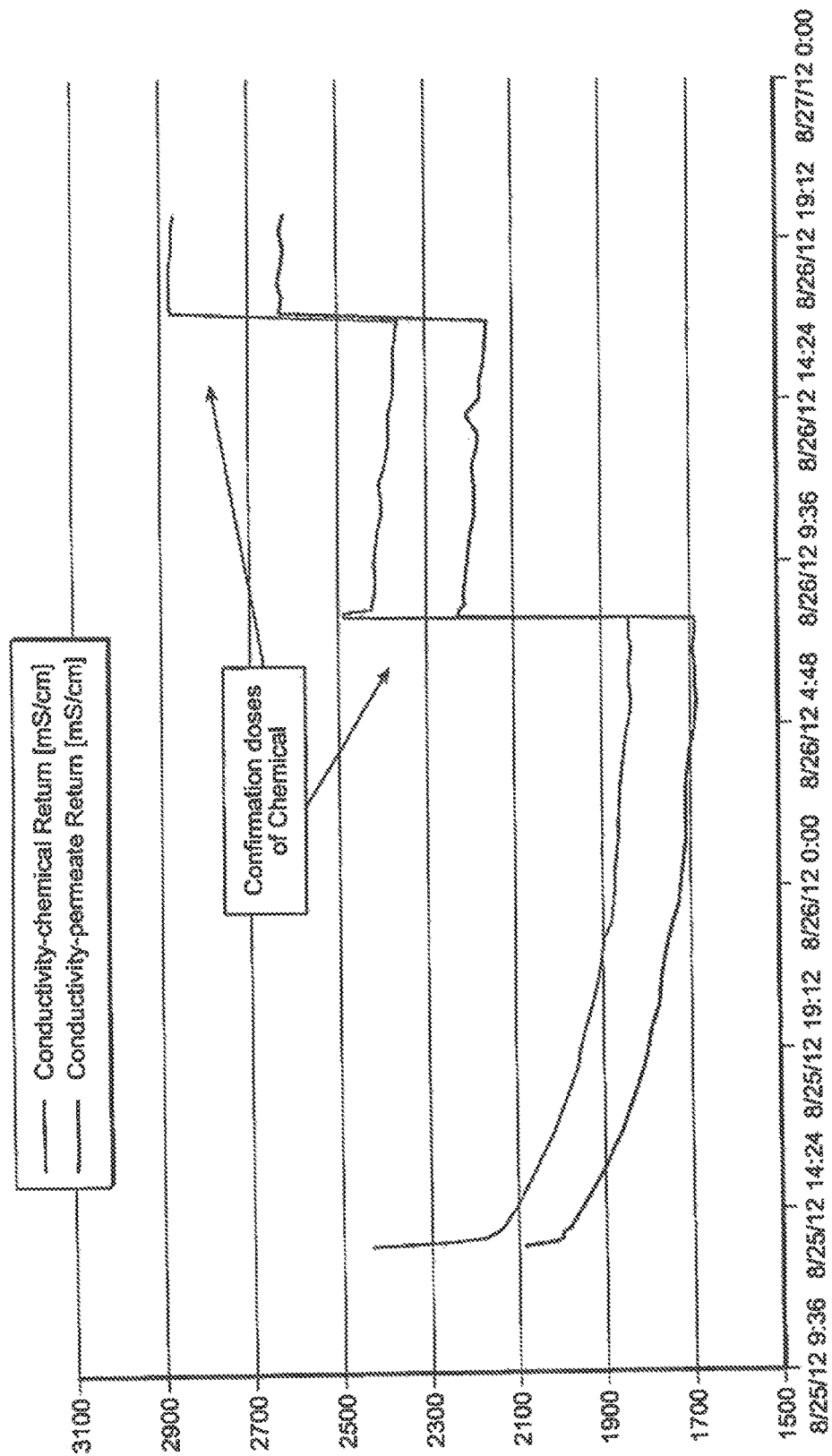
FIG. 10 depicts data from an initial baseline run to verify the full application of hydrophilic molecules to the available surface area of a filtration membrane in accordance with the present invention.

Using a system arrangement as reflected in FIGS. 8 and 9, a housing of 37 membranes were treated over a two day period. The hydrophilic molecules were added to the reaction tank in the amounts of 2.5 kg initially with subsequent confirmation doses of 3.5 kg and 3.0 kg. Initial uptake (as determined by the conductivity of the hydrophilic molecules in the reaction tank) on the membranes was rapid, and slowed as available surface area for treatment is reduced. Conductivity of the reaction solution is monitored to determine when the change in conductivity over time is reduced to zero to indicate that no additional chemical is being applied to the membranes in the reactor. In the initial baseline run, the data from which is depicted in FIG. 10, confirmation doses were added after apparent reaction completion to verify the full application of hydrophilic molecules to the available surface area.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

The invention claimed is:

1. A method for filtering hydrocarbons from waste water bi-products of mining operations comprising the steps of:
   selecting a manufactured filtration membrane, said manufactured filtration membrane having inorganic ceramic surfaces, said inorganic ceramic surfaces having a plurality of pores wherein each pore of said plurality of pores is at least 0.04 micron in size, said ceramic surfaces being processed through steps comprising:
      acidification of said ceramic surfaces for creating hydroxyl terminations; and
      functionalizing said ceramic surfaces including interior pore surfaces with one or more reactant zwitterionic hydrophilic molecules;
   causing said waste water bi-products to flow tangentially with respect to and in contact with an intake side of said manufactured and processed filtration membrane.

2. The method of claim 1 wherein said inorganic ceramic surfaces are configured substantially of materials selected from a group consisting of alumina (e.g., $Al_2O_3$), titania ($TiO_2$), and zirconia ($ZrO_2$).

3. The method of claim 1 wherein said reactant zwitterionic hydrophilic molecules include a hydrophilic carboxylic acid.

4. The method of claim 2 wherein said reactant zwitterionic hydrophilic molecules include a hydrophilic carboxylic acid.

5. The method of claim 1 wherein said reactant zwitterionic hydrophilic molecules include cysteic acid.

6. The method of claim 2 wherein said reactant zwitterionic hydrophilic molecules include cysteic acid.

7. The method of claim 1 further comprising the steps, before causing said flow of said waste water bi-products, of:
   introducing pH-changing means for changing the pH of said waste water bi-products to an undersaturated state relative to scale-producing constituents; and
   introducing scale inhibition means for inhibiting the formation of scales on said ceramic surfaces during exercise of said method.

8. The method of claim 7 wherein said scale inhibition means are selected from one or more of phosphates, phosphonates, polyphosphonic acid, acrylates, and polyacrylates.

9. The method of claim 1 further comprising the steps, before causing said flow of said waste water bi-products, of:
   introducing a pH-changing means, relative to a measure of said fluid to be processed through said method, for changing the pH of said waste water bi-products to an under-saturated state relative to scale-producing constituents; and
   introducing a scale inhibition means, relative to a measure of said fluid to be processed through said method, for inhibiting the formation of scales on said ceramic surfaces during exercise of said method.

10. The method of claim 9 wherein said scale inhibition means are selected from one or more of phosphates, phosphonates, polyphosphonic acid, acrylates, and polyacrylates.

11. The method of claim 1 wherein said reactant zwitterionic hydrophilic molecules include one or more carboxylic acids, phenyl amines, phenyl amidines, and amino pyridines.

12. The method of claim 1 wherein said waste water bi-products flow at a rate of at least 2.4 meters per second.

13. The method of claim 1 wherein trans-membrane pressure relative to said manufactured and processed filtration membrane is at least 0.25 bar.

14. The method of claim 1 wherein said functionalization is achieved through use of a pressurized recirculating flow.

15. A method for filtering hydrocarbons from waste water bi-products of mining operations comprising the steps of:
   selecting a manufactured filtration membrane, said manufactured filtration membrane having inorganic ceramic surfaces, said inorganic ceramic surfaces having a plurality of pores wherein each pore of said plurality of pores is at least 0.04 micron in size, said ceramic surfaces being processed through steps comprising:
      acidification of said ceramic surfaces for creating hydroxyl terminations; and
      functionalizing said ceramic surfaces including interior pore surfaces with one or more reactant zwitterionic hydrophilic molecules;
   introducing pH-changing means for changing the pH of said waste water bi-products to an undersaturated state relative to scale-producing constituents;

introducing scale inhibition means for inhibiting the formation of scales on said ceramic surfaces cause by contact of said waste water biproducts to said ceramic surfaces; and causing said waste water bi-products to flow tangentially with respect to and in contact with an intake side of said manufactured and processed filtration membrane, wherein said waste water bi-products flow at a rate of at least 2.4 meters per second.

16. A method for filtering hydrocarbons from waste water bi-products of mining operations comprising the steps of:

selecting a manufactured filtration membrane, said manufactured filtration membrane having inorganic ceramic surfaces, said inorganic ceramic surfaces having a plurality of pores wherein each pore of said plurality of pores is at least 0.04 micron in size, said ceramic surfaces being processed through steps comprising:

acidification of said ceramic surfaces for creating hydroxyl terminations; and functionalizing said ceramic surfaces including interior pore surfaces with one or more reactant zwitterionic hydrophilic molecules;

introducing pH-changing means for changing the pH of said waste water bi-products to an undersaturated state relative to scale-producing constituents;

introducing scale inhibition means for inhibiting the formation of scales on said ceramic surfaces cause by contact of said waste water biproducts to said ceramic surfaces; and causing said waste water bi-products to flow tangentially with respect to and in contact with an intake side of said manufactured and processed filtration membrane.

* * * * *